3,054,661
METHOD OF PREPARING SULFUR HEXAFLUORIDE
Earl L. Muetterties, West Chester, Pa., assignor to E. I. du Pont de Nemours and Company, Wilmington, Del., a corporation of Delaware
No Drawing. Filed Mar. 12, 1959, Ser. No. 798,827
9 Claims. (Cl. 23—205)

This invention relates to a new process for the preparation of fluorides of sulfur in which sulfur is at least tetravalent.

This application is a continuation-in-part of my copending application Serial No. 736,955, filed May 22, 1958, and now abandoned, itself a continuation-in-part of my application Serial No. 499,540, filed April 5, 1955, and now abandoned.

Sulfur hexafluoride (sulfur(VI) fluoride, $SF_6$), because of its desirable physical and chemical characteristics, and particularly because of its outstanding electrical properties, is of importance as a gaseous dielectric. In this use it exhibits the best overall properties of any known gaseous dielectric and therefore has achieved commercial significance, particularly for use in transformers. Sulfur hexafluoride is also useful in the preparation of fluorocarbons, since it can be reacted with carbon at elevated temperatures to give fluorocarbons, including tetrafluoroethylene, as described in U.S. Patent 2,709,186. Sulfur hexafluoride has hitherto been prepared from sulfur and elemental fluorine, which is difficult and dangerous to prepare and to handle, or from sulfur and some highly reactive inorganic fluorides, themselves prepared through use of elemental fluorine.

Other sulfur fluorides, in which the sulfur is at least tetravalent, which are obtained by the process of this invention are sulfur tetrafluoride (sulfur(IV) fluoride, $SF_4$) and thionyl fluoride, $SOF_2$.

An object of this invention is, therefore, provision of a novel method for synthesizing sulfur fluorides.

Another object is provision of a method for synthesizing sulfur hexafluoride which does not involve the use of elemental fluorine.

The above-mentioned and yet other objects are achieved in accordance with this invention by a process in which sulfur and chlorine are reacted, at a temperature of at least 300° C. and under substantially anhydrous conditions, with an inorganic binary fluoride of one of the following elements of the periodic table: hydrogen, elements of group I–B, elements of group II having atomic number at least 20, elements of group IV–A having atomic number at least 14, and elements of group V–A.

Throughout this discussion, the periodic table referred to is that of Deming (see Deming's "General Chemistry," 5th Ed., Wiley, 1944), which is in general use in many reference books, such as the Handbook of Chemistry and Physics, 30th Ed. (1947), published by the Chemical Rubber Publishing Company.

Thus, it will be seen that the fluorides suitable as starting materials in the process of this invention are: hydrogen fluoride; the group I–B metal fluorides; the alkaline earth metal fluorides (group II–A) from calcium fluoride down; the group II–B metal fluorides; the fluorides of group IV–A elements from silicon down; and the fluorides of the group V–A elements.

Of these starting materials, the fluorides giving the best results in this process are the fluorides of those elements in group I–B having atomic numbers 29 to 47, i.e., copper(I) and (II) fluorides, silver(I) and (II) fluorides; and the fluorides of elements in group II–B, i.e., zinc, cadmium and mercury fluorides. These constitute preferred groups.

In this reaction, the chlorine and the sulfur can be used either in elemental or in combined form. Thus, the reaction mixture can comprise, in addition to the inorganic fluoride, sulfur and chlorine as the separate elements; or sulfur dichloride, $SCl_2$, with or without additional chlorine; or sulfur monochloride, $S_2Cl_2$, with or without additional chlorine.

Instead of sulfur or a sulfur chloride, it is also possible to use one of a large class of sulfur-supplying reactants, the binary sulfides, which, in contact with chlorine under the operating conditions, form sulfur and/or a sulfur chloride. Such sulfur-supplying reactants are the sulfides of elements whose fluorides are operable in this process. They should be used in substantially anhydrous form. Suitable sulfides include, for example, CaS, BaS, CuS, ZnS, PbS, $As_2S_3$, $H_2S$, $P_2S_5$ and others.

It is not essential to use the reactants in stoichiometrical proportions. There can be used an excess of inorganic fluoride or an excess of sulfur and chlorine. However, in the interest of efficient utilization of the reactants, it is recommended to have the chlorine and the sulfur present in the system (separately or combined) in such amounts that the atom ratio Cl:S is at least 1:1. Since sulfur monochloride, where the Cl:S ratio is 1:1 (when no additional chlorine is used) is much less effective than the other systems, it is preferred to use the chlorine and the sulfur (separately or combined) in an atom ratio Cl:S of at least 1.5:1, and still more preferably at least 2:1.

The appropriate reaction temperature depends chiefly on the reactivity of the inorganic fluoride employed and on which sulfur fluoride is primarily desired. With the more reactive fluorides such as the fluorides of silver and mercury, a reaction temperature in the range of 300–450° C. is sufficient to secure practical reaction rates. With less reactive fluorides, correspondingly higher temperatures, e.g., in the range of 400–600° C., and/or longer reaction times, are recommended. It is not normally necessary to exceed temperatures of 1000° C., although higher temperatures such as 1500° C. or higher, can be used, e.g., in flow systems at or near atmospheric pressure.

The nature of the reaction product depends to a large extent on the reaction temperature and also on the length of the heating period. In the lower ranges, e.g., in the range of 300° C. to about 450° C., sulfur tetrafluoride is normally the predominant sulfur fluoride formed, especially if the heating period is short. At higher temperatures, the proportion of sulfur hexafluoride increases, and it may constitute the major amount of the sulfur fluorides formed. The reaction can be conducted at ordinary or at superatmospheric pressure. It is generally more convenient to carry out the reaction in pressure vessels when operating on a small or moderate scale.

When sealed reactors are used, the reaction is generally carried out under the autogenous pressure of the reactants and product at the temperature used. It is recommended to operate under as anhydrous conditions as possible if excessive formation of sulfur oxyfluorides ($SOF_2$ and $SO_2F_2$) and hydrogen fluoride resulting from the presence of water in the reaction system is to be avoided. The reaction vessels themselves must be capable of withstanding the pressures generated at the operating temperatures and also must be fabricated of materials unreactive with the reactants involved and the resultant products at the temperatures employed. Such materials are known in the chemical art. Probably the most common is a commercially available alloy of nickel, iron, and molybdenum known to the trade as "Hastelloy C." Depending on the temperature and on the reactivity of the inorganic fluoride, reaction times of about 30 minutes to 12 hours or more can be used. The vessels are preferably agitated, although this is not essential, and it is desirable to evacuate them substantially free of air before introducing the volatile reactants.

If desired, and for the purpose of insuring as high conversions as possible, a catalyst for the reaction can be added to the reaction zone in amounts ranging from 1–5% and up to 25–50% based on the inorganic binary fluoride reactant. Generally not over 25% will be used. Suitable such catalysts include the halogen exchange catalysts. These latter are inorganic halides, particularly the binary chlorides and fluorides of the transition elements, and especially the binary chlorides and fluorides of elements of groups V–A, VI–B, and VIII of the periodic table, e.g., phosphorus, antimony, chromium, iron, and the like, in all valence states, e.g., $PCl_3$, $PF_3$, $PCl_5$, $PF_5$, $SbCl_5$, $SbF_5$, $CrCl_2$, $CrCl_3$, $CrF_2$, $CrF_3$, $FeF_2$, $FeF_3$, $FeCl_2$, $FeCl_3$, and the like. Of these, the antimony, chromium and iron compounds are preferred and, of course, are of greatest utility when a binary fluoride of some other element is being used in the synthesis. It will be understood that the sole active reactants which make up the reacting system in greater than catalytic or impurity amounts are the inorganic fluoride and sulfur and chlorine (separately or in combination). In particular, the presence of carbon in elemental or combined form is to be avoided since carbon would react preferentially with the fluoride and chlorine to give halocarbons.

To isolate the sulfur fluorides from the reaction mixture, the volatile reaction products are first separated by evaporation, if desired under reduced pressure, from the non-volatile products (inorganic chloride, unreacted inorganic fluoride, sulfur, if any). The volatile material may contain, besides the binary sulfur fluorides, one or both of the sulfur chlorides and chlorine. Hydrogen chloride, thionyl fluoride, sulfuryl fluoride and hydrogen fluoride may also be present. These products are formed through hydrolysis of the sulfur chloride and/or sulfur tetrafluoride by adventitious moisture (sulfur hexafluoride is nonhydrolyzable) or through the presence of oxygen-containing impurities in the reactants. It should be noted in this connection that the methods of product analysis (infrared and mass spectroscopy) used in the examples which follow tend to magnify the amount of thionyl fluoride present beyond that actually formed because of the possibility of additional hydrolysis in the analytical equipment of the sample being tested.

Isolation of the sulfur fluorides, and especially of sulfur hexafluoride, can be carried out by one of the following procedures.

First, the more volatile (gaseous) portions of the reaction product are removed from the sulfur monochloride and sulfur dichloride. This is readily done by a simple distillation, which also removes most or all of the hydrogen fluoride, if any is present. Owing to its chemical inertness, sulfur hexafluoride can then be readily separated from the other volatile ingredients by treating the gaseous reaction product with aqueous alkali, which absorbs or hydrolyzes chlorine, hydrogen chloride, hydrogen fluoride, sulfur tetrafluoride and thionyl fluoride. Thus, this treatment leaves sulfur hexafluoride as the sole sulfur fluoride. This procedure is illustrated in some of the examples which follow.

If loss of the other sulfur fluorides is undesirable, the gaseous reaction product can be subjected to low temperature fractional distillation, whereby essentially pure sulfur hexafluoride can be isolated. The remainder will contain principally sulfur tetrafluoride, chlorine and thionyl fluoride. The latter two ingredients have boiling points close to that of sulfur tetrafluoride, but they can nevertheless be separated from it by fractionation, owing to the fact that they both form a constant boiling mixture with sulfur tetrafluoride. This mixture distills first, and the remainder of the product is substantially pure sulfur tetrafluoride. Chlorine can be removed from the constant boiling mixture, or directly from the crude gaseous reaction product, by treatment with sulfur, which absorbs chlorine with the formation of sulfur chlorides. This treatment can be effected by passing the gaseous mixture through a column containing finely-divided sulfur, or by maintaining it in contact with sulfur at room temperature and autogenous pressure in closed vessels for a short period of time.

In the event a mixture of sulfur hexafluoride and sulfur tetrafluoride is obtained, these two compounds can be separated by another method not involving fractional distillation. This method consists in maintaining the mixture of sulfur fluorides in contact with a tertiary amine (e.g., pyridine, triethylamine, etc.) at 100° C. or lower. Under such conditions, sulfur tetrafluoride forms a liquid or solid adduct with the tertiary amine, whereas sulfur hexafluoride does not react and can be separated directly in a substantially pure state. Sulfur tetrafluoride can then be recovered from the separated adduct by subjecting it to reduced pressures or elevated temperatures. This treatment dissociates the adduct with regeneration of the sulfur tetrafluoride.

For some uses, e.g., in the synthesis of fluorocarbons by reaction with carbon at elevated temperature, it is unnecessary to separate the sulfur tetrafluoride from the sulfur hexafluoride, since both fluorides are operable in such a process. Furthermore, the presence of thionyl fluoride or sulfuryl fluoride is not detrimental in such a use since these fluorides are also converted to fluorocarbons under the same conditions. Thus, the various sulfur fluorides formed in the process of this invention are all useful products.

The following examples, in which parts are by weight, illustrate the invention.

*Example I*

A pressure-resistant reaction vessel lined with an alloy of nickel, iron, and molybdenum was charged with 20 parts of anhydrous hydrogen fluoride, 36 parts (essentially equimolar proportion based on the fluoride) of chlorine, 6 parts (1.19 molar proportions based on the fluoride) of sulfur, and 5 parts of antimony(V) chloride catalyst, and the vessel was closed and heated until an internal temperature of 420° C. was reached, which required about one hour. The reactor was immediately cooled to room temperature, and the gaseous contents were then distilled into a stainless steel cylinder. Infrared spectroscopic analysis of the gaseous product showed the presence of hydrogen chloride and sulfur(VI) fluoride.

*Example II*

In the same manner as described in Example I, a mixture of 20 parts of anhydrous hydrogen fluoride, 48 parts (about 1.50 molar proportions based on the fluoride) of chlorine, 1 part of antimony(V) chloride catalyst, and, as a source of sulfur, 15 parts (about equimolar proportion based on the fluoride) of copper(II) sulfide was heated in a sealed reactor at 500° C. for three hours. After cooling the reaction mixture, the gaseous components were removed by distillation and were found by infrared spectroscopic analysis to contain hydrogen chloride and 0.5 to 1 percent sulfur(VI) fluoride.

*Example III*

As in Example I, a mixture of 119 parts of mercury(II) fluoride (containing 61% mercury(II) chloride), 10 parts (about 1.2 molar proportions based on the fluoride) of sulfur, and 48 parts (about equimolar proportion based on the fluoride) of chlorine was heated in a sealed reactor at 500 C. for a period of five hours. After cooling to room temperature, the gaseous portion of the reaction mixture (totaling 20 parts) was removed by distillation and scrubbed with aqueous potassium hydroxide solution. This treatment removed all acidic and hydrolyzable ingredients, including sulfur tetrafluoride and thionyl fluoride. There was thus obtained 4.3 parts of alkali-insoluble gaseous product, which by infrared spectroscopic analysis was shown to contain 20% sulfur(VI) fluoride, corresponding to an overall conversion of about 9% based on the mercury(II) fluoride actually present. The balance was essentially all air, introduced during the sampling and analytical manipulation.

*Example IV*

As in Example III, a mixture of 73.5 parts of lead(II) fluoride, 6 parts (about 2.0 molar proportions based on the fluoride) of sulfur, and 48 parts (about 2.3 molar proportions based on the fluoride) of chlorine was heated in a sealed reactor at 500° C. for five hours. Upon cooling to room temperature and removal of the gaseous material by distillation and subsequent scrubbing thereof with aqueous potassium hydroxide, there was obtained about 0.1 part of an alkali insoluble gas product which by infrared spectroscopic analysis was shown to contain 5 to 10% sulfur(VI) fluoride, the remainder being air.

*Example V*

In the manner of Example III, a mixture of 90 parts of mercury(II) fluoride, 6 parts (0.6 molar proportion based on the fluoride) of sulfur, 50 parts (2.0 molar proportion based on the fluoride) of chlorine, and 30 parts (0.67 molar proportion based on the fluoride) of calcium fluoride was heated at 500° C. for five hours. The reaction mixture was cooled rapidly to room temperature, and the gaseous materials were removed therefrom by distillation. The mixed gases (31 parts) were then scrubbed with aqueous potassium hydroxide, removing any sulfur(IV) fluoride and thionyl fluoride present and leaving 5.3 parts (20% conversion based on the fluoride) of alkali-insoluble gas which by infrared spectroscopic analysis was shown to contain mostly sulfur(VI) fluoride, the balance being air.

*Example VI*

As in Example III, a mixture of 120 parts of silver(I) fluoride, 9 parts (1.7 molar proportions based on the fluoride) of sulfur, and 48 parts (1.3 molar proportions based on the fluoride) of chlorine was heated for five hours at 500° C., and the reaction mixture was then cooled rapidly to room temperature. Distillation afforded 37.6 parts of gaseous material from which after scrubbing with aqueous potassium hydroxide, there was obtained 3.1 parts (11% conversion based on the fluoride) of alkali-insoluble gas. By infrared spectroscopic analysis this was found to consist mostly of sulfur(VI) fluoride.

*Example VII*

Another preparation identical to that of Example VI and varying only in that the reaction was carried out for three hours at 400° C. resulted in the formation of 20 parts of gaseous material. After the gaseous material had been scrubbed with aqueous potassium hydroxide, there was obtained 3.4 parts (14.5% conversion based on the fluoride) of an alkali-insoluble gas, which infrared spectroscopic analysis indicated to have as its major component sulfur(VI) fluoride.

Another identical preparation varying only in that the reaction was carried out for three hours at 300° C. resulted in the formation of 40 parts of gaseous material from which, after scrubbing with aqueous potassium hydroxide, there was obtained 2.7 parts of alkali-insoluble gas which infrared spectroscopic analysis indicated to contain 5% of sulfur(VI) fluoride (about 1% conversion based on the fluoride).

*Example VIII*

In the manner of Example III, a mixture of 40 parts of antimony(III) fluoride, 7 parts (2.0 molar proportions based on the fluoride) of sulfur, and 48 parts (equimolar proportion based on the sulfur) of chlorine was heated in a sealed reactor at 500° C. for three hours. The reactor was cooled to room temperature, and the gaseous components of the reaction mixture were removed by distillation. Infrared spectroscopic analysis of the gas showed it to contain sulfur(VI) fluoride.

*Example IX*

In the manner of Example III, a mixture of 60 parts of barium fluoride, 7 parts (about 2 molar proportions based on the fluoride) of sulfur, and 48 parts (equimolar proportion based on sulfur) of chlorine was heated in a sealed reactor at 500° C. for two hours. The reactor was cooled to room temperature, and the gaseous components of the reaction mixture were removed by distillation. Infrared spectroscopic analysis showed the presence of sulfur(VI) fluoride.

*Example X*

In the manner of Example III, a mixture of 16 parts of antimony(V) fluoride, 3 parts (1.6 molar proportions based on the fluoride) of sulfur, and 35 parts (2.7 molar proportions based on the fluoride) of chlorine was heated in a sealed reactor at 500° C. for two hours. The reactor was cooled to room temperature, and the gaseous components of the reaction mixture were removed by distillation. Infrared spectroscopic analysis showed the presence of sulfur(VI) fluoride.

*Example XI*

In the manner of Example III, a mixture of 80 parts of mercury(II) fluoride and 40 parts (0.89 molar proportion based on the fluoride) of sulfur monochloride, $S_2Cl_2$, was heated in a sealed reactor at 500° C. for two hours. The reactor was cooled to room temperature, and the gaseous components of the reaction mixture were removed by distillation. Infrared spectroscopic analysis showed the presence of sulfur(VI) fluoride.

*Example XII*

A 200-ml. bomb was charged with 4 parts of sulfur, 25 parts of chlorine, and 86 parts of mercury(II) fluoride, and heated without agitation at 450° C. for 0.5 hour. The volatile reaction product (23 parts) was found by infrared analysis to contain, on a molar basis, 25% of $SF_4$, 20% of $SOF_2$ and 1% of $SF_6$.

Other fluorides suitable for use in the process of this invention include, calcium fluoride, strontium fluoride, copper(I) fluoride, silver(II) fluoride, zinc(II) fluoride, cadmium(II) fluoride, silicon(IV) fluoride, germanium(II) fluoride, tin(II) fluoride, lead(IV) fluoride, nitrogen(III) fluoride, phosphorus(V) fluoride, arsenic(III) fluoride, arsenic(V) fluoride and bismuth(III) fluoride. As already mentioned, the preferred fluorides are those of elements of group I–B having atomic numbers from 29 to 47 and elements of group II–B.

Since obvious modifications in the invention will occur to those skilled in the chemical arts, I propose to be bound solely by the appended claims.

The embodiments of the invention in which an exclusive property or privilege is claimed are defined as follows:

1. The process which comprises heating together, at a temperature of at least 300° C., (1) an inorganic binary fluoride of a member of the first group consisting of hydrogen, elements of group I–B of the periodic table, elements of group II of the periodic table having an atomic number of at least 20, elements of group IV–A of the periodic table having an atomic number of at least 14, and elements of group V–A of the periodic table, (2) chlorine supplied by at least one member of the second group consisting of elemental chlorine, sulfur dichloride and sulfur monochloride, and (3) sulfur supplied by at least one member of the third group consisting of elemental sulfur, sulfur dichloride, and sulfur monochloride and subsequently recovering sulfur hexafluoride from the reaction mixture.

2. The process of claim 1 wherein the sulfur-supplying member of the third group is generated in situ from an inorganic binary sulfide of a member of the group consisting of hydrogen, elements of group I–B of the periodic table, elements of group II of the periodic table having an atomic number of at least 20, elements of group IV–A of the periodic table having an atomic number of at least 14, and elements of group V–A of the periodic table.

3. The process which comprises heating together, at a temperature of at least 300° C., an inorganic binary fluoride of an element of group I–B of the periodic table, chlorine and sulfur and subsequently recovering sulfur hexafluoride from the reaction mixture.

4. The process which comprises heating together, at a temperature of at least 300° C., an inorganic binary fluoride of an element of group II of the periodic table having an atomic number of at least 20, chlorine and sulfur and subsequently recovering sulfur hexafluoride from the reaction mixture.

5. The process which comprises heating together, at a temperature of at least 300° C., an inorganic binary fluoride of an element of group IV–A of the periodic table having an atomic number of at least 14, chlorine and sulfur and subsequently recovering sulfur hexafluoride from the reaction mixture.

6. The process which comprises heating together, at a temperature of at least 300° C., an inorganic binary fluoride of an element of group V–A of the periodic table, chlorine and sulfur and subsequently recovering sulfur hexafluoride from the reaction mixture.

7. The process which comprises heating together, at a temperature of at least 300° C., (1) mercuric fluoride, (2) chlorine supplied by at least one member of the class consisting of elemental chlorine, sulfur dichloride and sulfur monochloride, and (3) sulfur supplied by at least one member of the class consisting of elemental sulfur, sulfur dichloride, and sulfur monochloride and subsequently recovering sulfur hexafluoride from the reaction mixture.

8. The process which comprises heating together, at a temperature of at least 300° C., mercuric fluoride, sulfur and chlorine and subsequently recovering sulfur hexafluoride from the reaction mixture.

9. The process of preparing sulfur hexafluoride which comprises heating together mercuric fluoride, sulfur, and chlorine at a reaction temperature of at least about 400–500° C. and subsequently recovering sulfur hexafluoride from the reaction mixture.

References Cited in the file of this patent

UNITED STATES PATENTS 2,104,695    Gleave _____ Jan. 4, 1938

OTHER REFERENCES

Mellor: "Comprehensive Treatise on Inorganic and Theoretical Chemistry," Supp. II, Part I, 1956, page 58.

Bailar: "Inorganic Synthesis," 1953, vol. IV, pages 133–141.